(12) United States Patent
Taylor et al.

(10) Patent No.: US 8,236,093 B2
(45) Date of Patent: Aug. 7, 2012

(54) POWER PLANT EMISSIONS CONTROL USING INTEGRATED ORGANIC RANKINE CYCLE

(75) Inventors: Robert Warren Taylor, Ponte Vedra Beach, FL (US); James Easel Roberts, Kansas City, MO (US); Charles Michael Booth, Norcross, GA (US)

(73) Assignee: BHA Group, Inc., Kansas City, MO (US)

(*) Notice: Subject to any disclaimer, the term of this patent is extended or adjusted under 35 U.S.C. 154(b) by 341 days.

(21) Appl. No.: 12/560,520

(22) Filed: Sep. 16, 2009

(65) Prior Publication Data

US 2011/0061528 A1  Mar. 17, 2011

(51) Int. Cl.
*B01D 50/00* (2006.01)
(52) U.S. Cl. .................. 95/273; 95/288; 95/63; 95/149; 95/64; 95/65; 95/66; 95/67; 95/73; 95/227; 95/228; 95/229; 96/52; 96/55; 96/57; 96/243; 60/641.1; 60/641.2; 60/641.5; 60/641.15; 60/651; 60/665; 60/649; 60/645; 60/39.181; 60/670; 60/671; 60/653; 60/783
(58) Field of Classification Search .................. 95/273, 95/274, 283, 288, 289, 63, 64, 65, 66, 67, 95/73, 227, 228, 229; 96/146, 150, 52, 55, 96/57; 210/676; 60/641.1, 641.2, 641.5, 60/670, 671, 39.5, 641.15, 651, 655, 649, 60/645, 783, 653, 39.181; 376/370
See application file for complete search history.

(56) References Cited

U.S. PATENT DOCUMENTS

| 2,917,130 | A | * | 12/1959 | Powers ............................. 96/67 |
| 3,231,492 | A | * | 1/1966 | Hardison et al. .............. 210/676 |
| 4,292,050 | A | | 9/1981 | Linhardt et al. |
| 5,816,048 | A | * | 10/1998 | Bronicki et al. ............. 60/641.5 |
| 6,751,959 | B1 | * | 6/2004 | McClanahan et al. .......... 60/670 |
| 6,857,268 | B2 | | 2/2005 | Stinger et al. |
| 7,096,665 | B2 | | 8/2006 | Stinger et al. |
| 2003/0233830 | A1 | * | 12/2003 | Marin et al. .................... 60/649 |
| 2008/0098890 | A1 | | 5/2008 | Feher |
| 2009/0282836 | A1 | * | 11/2009 | Mak ............................... 60/783 |
| 2009/0308073 | A1 | * | 12/2009 | Bonaquist et al. .............. 60/645 |
| 2010/0154381 | A1 | * | 6/2010 | Rapp et al. ................. 60/39.181 |
| 2010/0313565 | A1 | * | 12/2010 | Kaplan et al. ................... 60/670 |
| 2010/0326076 | A1 | * | 12/2010 | Ast et al. .......................... 60/671 |
| 2011/0011052 | A1 | * | 1/2011 | Bronicki ........................ 60/39.5 |
| 2011/0041502 | A1 | * | 2/2011 | Zimron et al. ............. 60/641.15 |
| 2011/0051880 | A1 | * | 3/2011 | Al-Mayahi et al. ........... 376/370 |
| 2011/0072819 | A1 | * | 3/2011 | Silva et al. ....................... 60/651 |
| 2011/0072820 | A1 | * | 3/2011 | Finkenrath et al. ............. 60/655 |

(Continued)

*Primary Examiner* — Duane Smith
*Assistant Examiner* — Minh-Chau Pham
(74) *Attorney, Agent, or Firm* — Pearne & Gordon LLP (57) ABSTRACT

A method of reducing the concentration of pollutants in a combustion flue gas having a first temperature is provided. The method includes the step of providing an organic Rankine cycle apparatus utilizing a working fluid and including at least one heat exchanger is arranged in thermal communication with the flue gas. The method further includes the step of reducing the temperature of the flue gas to a second temperature less than the first temperature by vaporizing the working fluid within the heat exchanger utilizing thermal energy derived from the flue gas. The method further includes the step of filtering the flue gas through at least one filter disposed downstream of the heat exchanger to remove pollutants from the flue gas. An associated system configured to reduce the concentration of pollutants in the combustion flue gas is also provided.

20 Claims, 4 Drawing Sheets

U.S. PATENT DOCUMENTS

| | | | |
|---|---|---|---|
| 2011/0083437 A1* | 4/2011 | Ast et al. | 60/671 |
| 2011/0100009 A1* | 5/2011 | Lehar et al. | 60/651 |
| 2011/0126539 A1* | 6/2011 | Ramaswamy et al. | 60/641.2 |
| 2011/0146278 A1* | 6/2011 | Deng et al. | 60/653 |
| 2011/0209474 A1* | 9/2011 | Leibowitz | 60/641.1 |
| 2011/0315096 A1* | 12/2011 | Wilson et al. | 123/3 |

* cited by examiner

POWER PLANT EMISSIONS CONTROL USING INTEGRATED ORGANIC RANKINE CYCLE

BACKGROUND OF THE INVENTION

1. Field of the Invention

The invention relates generally to systems and methods for the reduction of pollutants in the flue gas of combustion processes.

2. Discussion of Prior Art

A majority of utility boilers in the world burn coal or oil for their heat source. Combustion of coal or oil creates gaseous products of combustion. The major constituents of these gasses are nitrogen oxides and carbon dioxide. Also contained in the flue gas stream are various pollutants, the quantity of which is largely dependent on the constituents contained in the fuel burned. Many of these utility boilers are utilized as power plants to provide electricity.

Current regulations limit the quantity of nitrogen oxides, sulfur oxides, and particulate matter that can be emitted by a utility boiler. Additionally, some regions limit pollutants responsible for haze or the like. Regulations limiting the emission of mercury are either already in place in various states, and are pending at the federal level. Additional regulations are pending that relate to acid gasses and hazardous air pollutants, such as heavy metals in gaseous form.

Particulate matter can be conventionally removed using an electrostatic precipitator or in some cases a fabric filter. With respect to the gaseous pollutants, the conventional removal approach is to cool the products of combustion by evaporating water injected into a scrubber, such as a wet scrubber. Slurry of water that contains sorbents can be injected into the hot gas. Using this method, the gas is cooled by evaporation of water, from the temperature at the air heater outlet, to the saturation temperature of the gas. At the saturation temperature, many of the pollutants that were gasses condense into saturated droplets. At this point in the scrubbing process, many of the pollutants are removed from the flue gas stream as a component of the water circulating in the scrubber tower or as a sulfite or sulfate particle. However, scrubbers may not be effective at removing acid gasses from the combustion products.

Cooling of the flue gas stream through evaporation requires significant quantities of clean fresh water. The heat energy in the hot flue gas is wasted to atmosphere during the evaporation process. Additionally, localized high humidity levels can create fogging and other isolated weather phenomenon. As a result, the evaporation cooling method wastes energy and water.

BRIEF DESCRIPTION OF THE INVENTION

The following presents a simplified summary of the invention in order to provide a basic understanding of some aspects of the invention. This summary is not an extensive overview of the invention. It is intended to identify neither key nor critical elements of the invention nor delineate the scope of the invention. Its sole purpose is to present some concepts of the invention in a simplified form as a prelude to the more detailed description that is presented later.

In accordance with an aspect of the invention, a method of reducing the concentration of pollutants in a combustion flue gas having a first temperature is provided. The method includes the step of providing an organic Rankine cycle apparatus utilizing a working fluid and including at least one heat exchanger is arranged in thermal communication with the flue gas. The method further includes the step of reducing the temperature of the flue gas to a second temperature less than the first temperature by vaporizing the working fluid within the heat exchanger utilizing thermal energy derived from the flue gas. The method further includes the step of filtering the flue gas through at least one filter disposed downstream of the heat exchanger to remove pollutants from the flue gas.

In accordance with another aspect of the invention, a method of reducing the concentration of pollutants in a combustion flue gas having a first temperature is provided. The method includes the step of providing an organic Rankine cycle apparatus utilizing a working fluid and including at least one heat exchanger, turbine, condenser, and pump arranged in closed-loop fluid communication. The at least one heat exchanger is arranged in thermal communication with the flue gas. The method further includes the step of reducing the temperature of the flue gas to a second temperature less than the first temperature by vaporizing the working fluid within the heat exchanger utilizing thermal energy derived from the flue gas. The method further includes the step of filtering the flue gas through at least one filter disposed downstream of the heat exchanger to remove pollutants from the flue gas.

In accordance with yet another aspect of the invention, a system is provided to reduce the concentration of pollutants in a combustion flue gas having a first temperature. The system includes an organic Rankine cycle apparatus utilizing a working fluid and including at least one heat exchanger, turbine, condenser, and pump arranged in closed-loop fluid communication. The at least one heat exchanger is arranged in thermal communication with the flue gas. The temperature of the flue gas is reduced, via the at least one heat exchanger, to a second temperature less than the first temperature by vaporizing the working fluid within the heat exchanger utilizing thermal energy derived from the flue gas. The system further includes a second heat exchanger arranged in thermal communication with the flue gas, the second heat exchanger being disposed downstream of the at least one heat exchanger of the organic Rankine cycle apparatus. The temperature of the flue gas is reduced, via the second heat exchanger, to a third temperature less than the second temperature by the thermal communication of the flue gas with the second heat exchanger. The system further includes at least one scrubber disposed downstream of at least one of the heat exchangers and configured to remove pollutants from the flue gas by filtering the flue gas therethrough.

BRIEF DESCRIPTION OF THE DRAWINGS

The foregoing and other features and advantages of the invention will become apparent to those skilled in the art to which the invention relates upon reading the following description with reference to the accompanying drawings, in which.

DETAILED DESCRIPTION OF THE INVENTION

Example embodiments that incorporate one or more aspects of the invention are described and illustrated in the drawings. These illustrated examples are not intended to be a limitation on the invention. For example, one or more aspects of the invention can be utilized in other embodiments and even other types of devices. Moreover, certain terminology is used herein for convenience only and is not to be taken as a limitation on the invention. Still further, in the drawings, the same reference numerals are employed for designating the same elements.

Systems and methods for condensing acids and vaporous hazardous air pollutants in an energy efficient manner are described herein. In one example, an organic Rankine cycle (ORC) can be used to extract energy from low temperature gas streams to improve the efficiency and effectiveness of the pollution reduction process.

Figure 1:
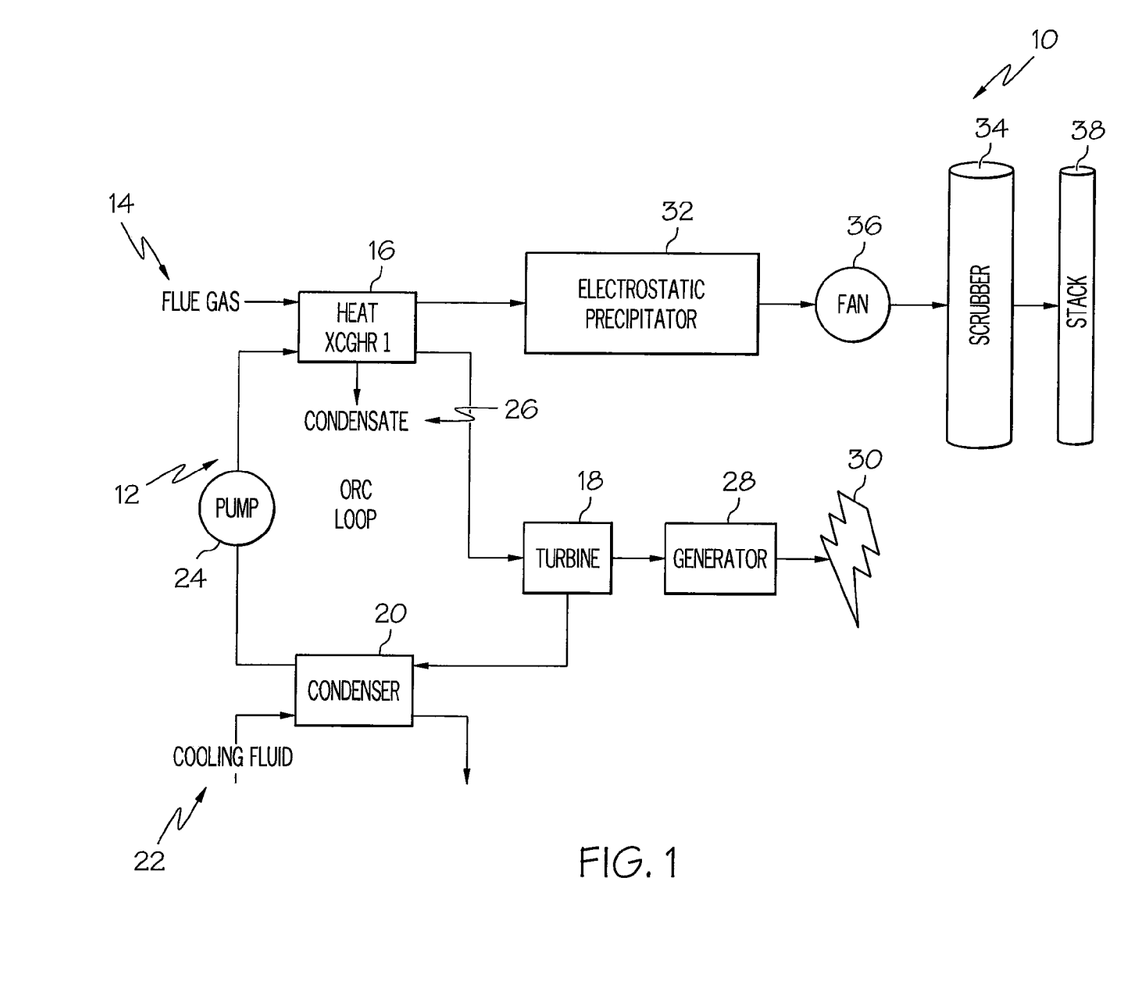
FIG. 1 illustrates an example system for the reduction of pollutants in flue gas of combustion processes.

Turning to the shown example of FIG. 1, an example system 10 for the reduction of pollutants in the flue gas of combustion processes is illustrated. It is to be understood that the Figures are schematic illustrations of the various systems and methodologies discussed herein, and that any symbols, words, etc. appearing thereon are for reference only and are not intended to provide any limitations on the present application. An organic Rankine Cycle (ORC) apparatus 12 is integrated into the scrubbing process of flue gas 14 to provide cooling of the flue gas 14 stream ahead of one or more downstream filtration systems, such as electrostatic precipitators and/or scrubbers. Various pollutants can be reduced or removed, such as SO2, SO3, HCl, mercury, etc. ORC can provide various benefits, such as cooling of exhaust gas through recovery of waste heat, generation of auxiliary power, generation of shaft horsepower, generation of re-usable condensate water, control of reactor temperature through modifying heat exchanger efficiency, and/or improving overall thermal efficiency of a plant.

For example, the waste heat derived through the ORC apparatus 12 can be used to generate power or create shaft horsepower to thereby capture additional power output from the relatively low temperature exhaust flue gas 14 stream of the boiler. In addition or alternatively, flue gas 14 which has been cooled to saturation using the ORC apparatus 12 would enter the scrubber tower where sorbents can be introduced. In addition or alternatively, a portion of the water condensed from the exhaust gas may be utilized for other applications in the power plant, such that water usage can be significantly reduced as a result of the ORC system cooling. In addition or alternatively, integrating the condensing cooling section into the scrubbing process can make the process effective at removal of acid gasses, which is a target of pending regulations. Condensing of the acids can also improve removal of mercury through increased oxidation of elemental species to ionic.

Various ORC configurations can be utilized. In general, the ORC apparatus 12 operates on the principles of the Rankine system, wherein the working fluid is evaporated, passes through a turbine where it is expanded to generate useful work, and is finally re-condensed in a generally continuous closed-loop cycle. In short summary, the ORC apparatus 12 can include a heat exchanger 16 (i.e., a high temperature heat exchanger) wherein the working fluid is vaporized by utilizing thermal energy derived from the hot flue gas 14. After exiting the heat exchanger 16, the ORC apparatus 12 can further include an expansion turbine 18 wherein the vaporized working fluid is expanded to produce electrical and/or mechanical energy. After exiting the expansion turbine 18, the ORC apparatus 12 can further include a condenser 20 wherein the working fluid is condensed into a liquid using a cooling fluid 22 or the like in a low temperature heat exchanger, as is known in the art. After exiting the condenser 20, the condensed liquid can be pressurized with a pump 24, and the closed loop hermetic ORC cycle can be continuously repeated. It is to be understood that various numbers and/or configurations of the heat exchanger 16, turbine 18, condenser 20 and pump 24 can be utilized. For example, a plurality of turbines (not shown) can be operatively connected in a parallel or serial arrangement to power multiple power generations devices, such as generator, pump, compressor, etc. using various speed changing means or the like. Similarly, a plurality of heat exchangers, pumps, condensers, or the like can be utilized.

The ORC apparatus 12 can use a working fluid that allows heat recovery from relatively low temperature sources, such as industrial flue gas 14 produced as a byproduct of coal or oil burning utility boilers. Various working fluids can be utilized, provided that the temperature of the heat source is high enough to vaporize the working fluid in the closed loop hermetic ORC cycle. In one example, various hydrocarbons can be used, such as pentane, propane, butane, etc. In other examples, ammonia, water, Freon, or the like can be used. From another perspective of examples, use may be made of any environmentally-friendly fluids or mixtures, such as those currently accepted for air conditioning applications. Moreover, the ORC apparatus 12 is a closed loop, hermetically sealed system that is emission free since it does not depend on a separate fuel source or operation in conjunction with another power generation system to produce useful energy.

The high temperature heat exchanger 16 of the ORC apparatus 12 can be located at the outlet of the conventional air heater that serves most modern utility boilers. At this point in the process, the flue gas 14 can have a temperature of approximately 270° F. to 400° F. (132° C. to 204° C.), depending upon variables of the utility boiler operation, etc. There are various scenarios for temperature reduction at the outlet of the air heater, and exact cycle parameters may be defined by the actual temperature of the flue gas 14 at the outlet of the conventional air heater. In one example (see FIG. 1), the ORC heat exchanger 16 can be used to lower the temperature of the flue gas 14 stream to levels below the acid dew point of the flue gas mixture. It is to be understood that the acid dew point of the flue gas mixture can be a dynamic value that varies based upon numerous variables of the flue gas 14, such as the moisture content, temperature, pressure, and/or the quantity of various acids. Moreover, the acid dew point of the flue gas mixture may be unique to each facility, each fuel burned, and/or other operating conditions. However, for the purposes of this application, the acid dew point of the flue gas is understood to refer to the temperature of the flue gas at which at least a portion of the acids contained within the flue gas begin to condense to a liquid form.

In such an arrangement, the heat exchanger 16 could be a condensing heat exchanger capable of withstanding the corrosion associated with acids. In this arrangement, flue gas 14 temperature can be approximately 125° F. to 175° F. (52° C. to 80° C.). In other words, the high temperature heat exchanger 16 can reduce the temperature of the flue gas 14 by approximately 145° F. to about 275° F. (60° C. to 135° C.) below the temperature of the flue gas 14 at the outlet of the conventional air heater. Acids can condense and many of the heavy metals that are water-soluble can be captured in the surrounding liquids. It is to be understood that all temperature ranges described herein are approximate and are used to illustrate various examples, and that various other temperatures and/or temperature ranges can also be utilized.

Condensed water vapor 26 can be recovered during this process via the use of appropriate collection structure. When treated, the water 26 can be utilized to fulfill other plant needs, and may even be useful further in the various pollution reduction systems described herein. For example, the water 26 can be treated to remove contaminants (e.g., acids, heavy metals, etc.) before being re-circulated. In addition or alternatively, the heat contained in the recovered water can be utilized in the thermal process such that a net improvement in plant efficiency can be achieved. The recovery of water 26 can also represent a net decrease in plant water consumption.

It is widely understood that acids can promote oxidation of elemental mercury. Elemental mercury is not water soluble, while oxidized mercury is. If condensed acids oxidize elemental mercury, a larger portion of the gaseous mercury contained in the flue gas 14 can become part of the liquid solution exiting the heat exchanger 16. This represents capture of a pollutant as a by-product of the primary cooling process. In short, the heat exchanger 16 can contribute to a reduction in pollutants in the flue gas 14, such as before the flue gas is filtered downstream by conventional filtration systems.

Energy extracted from the hot flue gas 14 through the ORC can be utilized to generate electricity that would improve the station power factor. For example, the heat energy extracted by the high temperature heat exchanger 16 can be utilized via expansion of the working fluid in the turbine 18. The turbine 18 can be operatively coupled to at least one driven device, such as a generator, chiller, etc. For example, rotation of the turbine 18 can drive one or more generators 28 to generate electrical or mechanical energy 30. Using the ORC apparatus 12 to generate electricity can results in more generation capacity for a power plant without burning additional fuel, which can represent an improvement in carbon dioxide emissions and/or plant efficiency. Similarly, rotation of the turbine 18 can drive the chiller or other driven device.

The flue gas 14 exiting the condensing heat exchanger 16 can be subsequently filtered via one or more filtration devices, such as at least one of an electrostatic precipitator, a scrubber, etc. to further remove solid or liquid contaminants entrained within the flue gas 14. That is, the filtration devices can include either, or both, of an electrostatic precipitator, a scrubber, or even other filtration structure, and may include pluralities thereof. In one example, the flue gas 14 can enter an electrostatic precipitator 32 or the like for the purpose of removing particulate matter, as is utilized by a majority of utility boilers in the world for particulate control. It is widely known that an electrostatic precipitator 32 is generally sensitive to the resistivity of the particulate treated. As the temperature of the particulate decreases and acids condense on the surface of the particulate, electrostatic precipitator performance improves significantly. In addition, the reduction in temperature of the flue gas 14 can increase the flue gas density and cause the volume of gas entering the electrostatic precipitator to decrease by approximately 15% to 25%, or even more. Collection efficiency of the electrostatic precipitator is exponentially related to the gas volume treated, and as a result relatively small reductions in flue gas 14 volume can result in relatively large increases in particulate removal efficiency.

Historically, flue gas temperature at the inlet to the electrostatic precipitator 32 was limited to approximately 270° F. to 400° F. (132° C. to 204° C.). This was necessary to avoid corrosion by maintaining the flue gas temperature above the acid dew point. However, in the example system 10 described above, acids can be removed in the condensing heat exchanger 16, thereby lowering the acid concentration in the flue gas 14. Elimination of acids reduces the need to maintain high gas temperatures in the electrostatic precipitator. In addition or alternatively, electrostatic precipitator 32 performance can also be facilitated through agglomeration of the incoming particulate. This agglomeration will occur as a result of the condensation of vapors contained in the flue gas 14. Generally, the electrostatic precipitator 32 particulate removal efficiency can improve as particle size increases.

However, despite removal of acids from the flue gas 14 prior to further filtration, acid droplet carry-over can still damage a downstream filter, such as the electrostatic precipitator 32. Thus, for example, a strategy can be employed whereby the acid droplets can be reduced, such as removed, from the stream of flue gas 14 after the heat exchanger 16 and before the cooled gas reaches the metal surfaces of the electrostatic precipitator 32. One example strategy to reduce acid droplets entering the electrostatic precipitator 32 could be an "air washer" concept that is described in either of U.S. Patent Application Publication Nos. 2008/0098890 and/or 2008/0098891, both of which are expressly incorporated herein by reference thereto. While the noted patent applications generally describe a way of scrubbing sand or acid pollutants from the inlet to gas turbines while chilling the inlet air to improve turbine performance, they involve the use of chilled water sprays ahead of mist eliminators. Since they can be made of plastic, their corrosion via acid droplets in the stream can be reduced or avoided. Thus, such a strategy may also work in a coal power plant, though the electrostatic precipitators 32 may still allow some particulates to pass through.

In an alternative configuration, though not shown, the condensing heat exchanger 16 can be disposed downstream of the electrostatic precipitator 32 or other filtration device. For example, where the heat exchanger 16 is a condensing-type heat exchanger, the presence of the particulate loading and the corresponding possibility of fouling the surfaces of the heat exchanger 16 can lead to an alternative placement strategy for the initial heat exchanger 16 being downstream of the electrostatic precipitator 32 or other filtration device. Thus, the condensing heat exchanger 16 will experience pre-filtered flue gas 14, which may increase the efficiency and/or lifespan of the heat exchanger 16.

In addition or alternatively, flue gas 14 can subsequently enter a scrubber 34 disposed downstream from the electrostatic precipitator 32. One or more fans 36 or the like can be disposed at various locations along the flow path of the flue gas 14 to move the flue gas 14 through the system 10. Various dry, semi-dry, or wet scrubbers, as are known to one of skill in the art, can be utilized for further remove pollutants from the flue gas 14. Where a semi-dry or wet scrubber is used, the water condensate 26 captured from the high temperature heat exchanger 16 can be treated and used within the scrubber 34 to thereby further reduce water demands of the system 10. Subsequent to the one or more filtration devices (e.g., electrostatic precipitator 32, scrubber 34), the cleaned flue gas 14 can be exhausted from the system 10 via a conventional exhaust stack 38 or the like, and/or can be further treated, filtered, etc.

Figure 2:
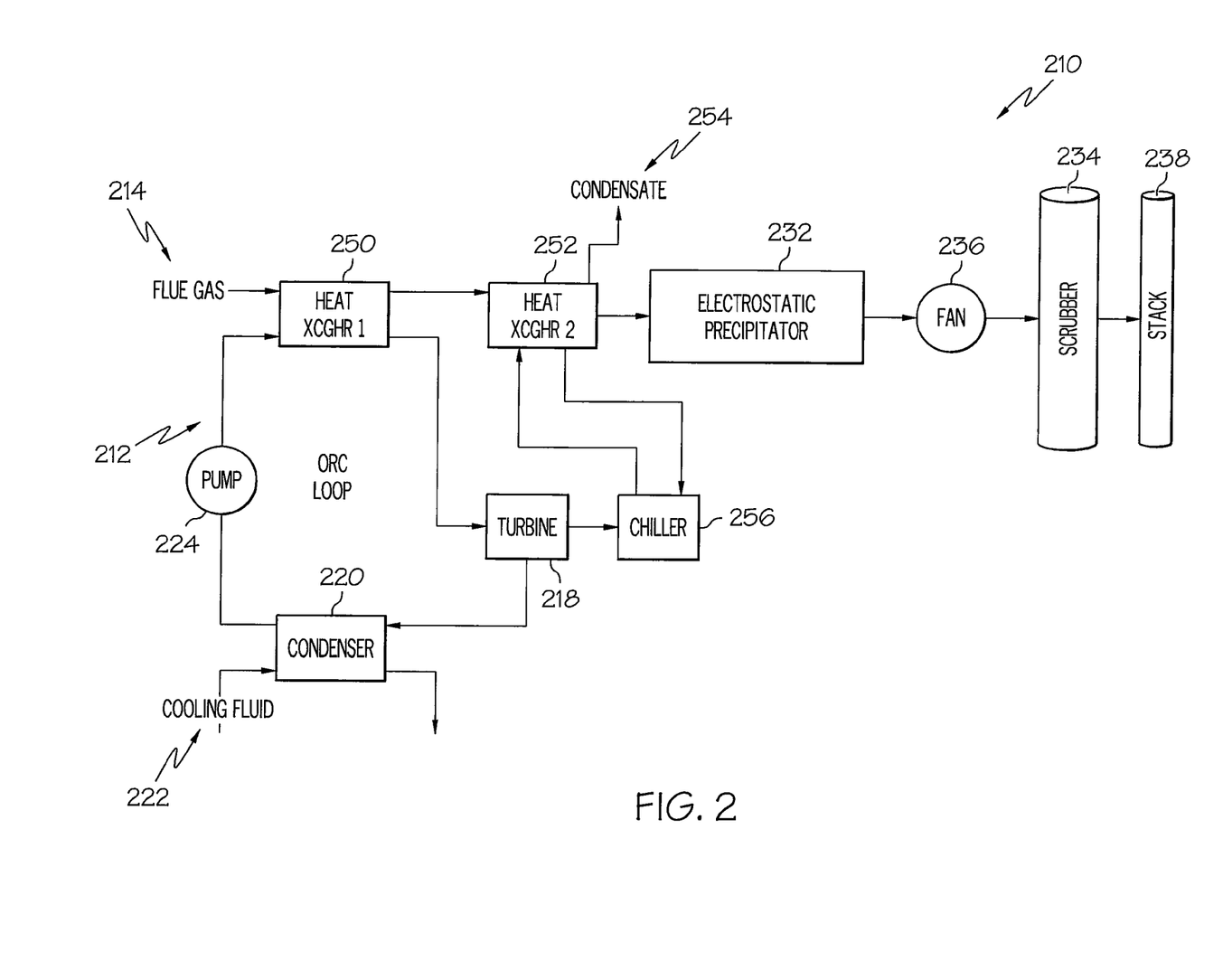
FIG. 2 illustrates another example system for the reduction of pollutants in the flue gas of combustion processes.

Turning now to the example of FIG. 2, another example system 210 for the reduction of pollutants in the flue gas of combustion processes is illustrated. It is to be appreciated that, for brevity, similar or identical elements are referenced by use of a like number in a 200-series designation (i.e., 212, 214, etc.), and that the example system 210 can include more or less elements than those previously described herein. Different or new elements are referenced by a new number. Similarly, for brevity, further discussion of similar or identical elements may be limited, but such previous discussion of similar or identical elements is hereby incorporated by reference.

As before, the ORC apparatus 212 is integrated into the scrubbing process to provide cooling of the flue gas 214 stream ahead of one or more downstream filtration systems, such as electrostatic precipitators 232 and/or scrubbers 234. Also as before, the ORC apparatus 212 operates on the principles of the Rankine system, including a heat exchanger (as will be further discussed), turbine 218, condenser 220, and pump 224.

The instant ORC apparatus 212 utilizes two heat exchangers 250, 252. The first heat exchanger 250, which can be referred to as a high temperature heat exchanger, can cool the flue to temperatures above the acid dew point. As a result, the first heat exchanger 250 can be fabricated from conventional materials. The heat energy extracted by the first heat exchanger 250 can be utilized, via expansion of the working fluid in the turbine 218, to generate useful electrical or mechanical work. Similarly, if present, condensed water vapor (not shown) can be recovered during this process that, when treated, can be utilized to fulfill other plant needs.

A second heat exchanger 252 disposed downstream from the first heat exchanger 250 can be utilized to further reduce the temperature of the flue gas 214 to a temperature below the acid dew point. As such, the second heat exchanger 252 can be manufactured of corrosive resistant materials because the reduced flue gas 214 temperature would be reduced to a level that causes acids to condense thereon.

The second heat exchanger 252 could utilize a second low temperature loop in the ORC apparatus 212 (or even a separate ORC), or could utilize cool liquid generated in a chiller 256 powered by the primary ORC cycle. Though not shown, the chiller 256 can even be electrically powered via electrical power generated by a generator (now shown) driven by the turbine 218. Similarly, both of the chiller and a generator (not shown) can be operatively coupled to the turbine 218. For example, as shown, the turbine 218 can generate useful electrical or mechanical work, such as shaft horsepower, to drive the chiller 256 to chill a desired liquid. In one example, the chiller 256 could cool fresh water to temperatures of approximately 40° F. to 50° F. (4° C. to 10° C.). In one example, the chilled water could be injected into the reactor tower to super cool the gas stream thereby increasing the amount of condensable acids removed form the flue gas. In applications where low gas temperature is not required, the chilled water could circulate through a heat exchanger at the outlet of the reactor tower (i.e., see FIG. 4) that could condense and agglomerate droplets preventing their release to atmosphere.

This chilled liquid would cause the flue gas 214 stream passing through the second heat exchanger 252 to drop below the acid dew point condensation temperature, removing many of the water-soluble pollutants. Depending on the final temperature desired, the second heat exchanger 252 could provide flue gas 214 at approximately 85° F. to 100° F. (29° C. to 38° C.) at the inlet to the electrostatic precipitator 232. At these inlet temperatures, electrostatic precipitator 232 performance would be dramatically improved. In addition or alternatively, the second heat exchanger 252 can produce condensed water vapor 254 that, when treated, can be utilized to fulfill other plant needs, such as the chiller 256 or other needs.

A relatively large percentage of scrubber 234 maintenance costs can be attributed to particulate contained in the incoming flue gas 214 stream. As the electrostatic precipitator 232 particulate removal efficiency increases, maintenance of the scrubber 234 can decrease, thereby lowering operating cost of the system. Removal of the water-soluble portion of mercury contained in the flue gas 214 can reduce, such as eliminate, some or all of the mercury contained in scrubber waste. Many wet scrubbers create gypsum as a waste product that is sold to wallboard plants. Reduction or removal of the mercury upstream of the scrubber could eliminate concerns related to mercury in wallboard.

Figure 3:
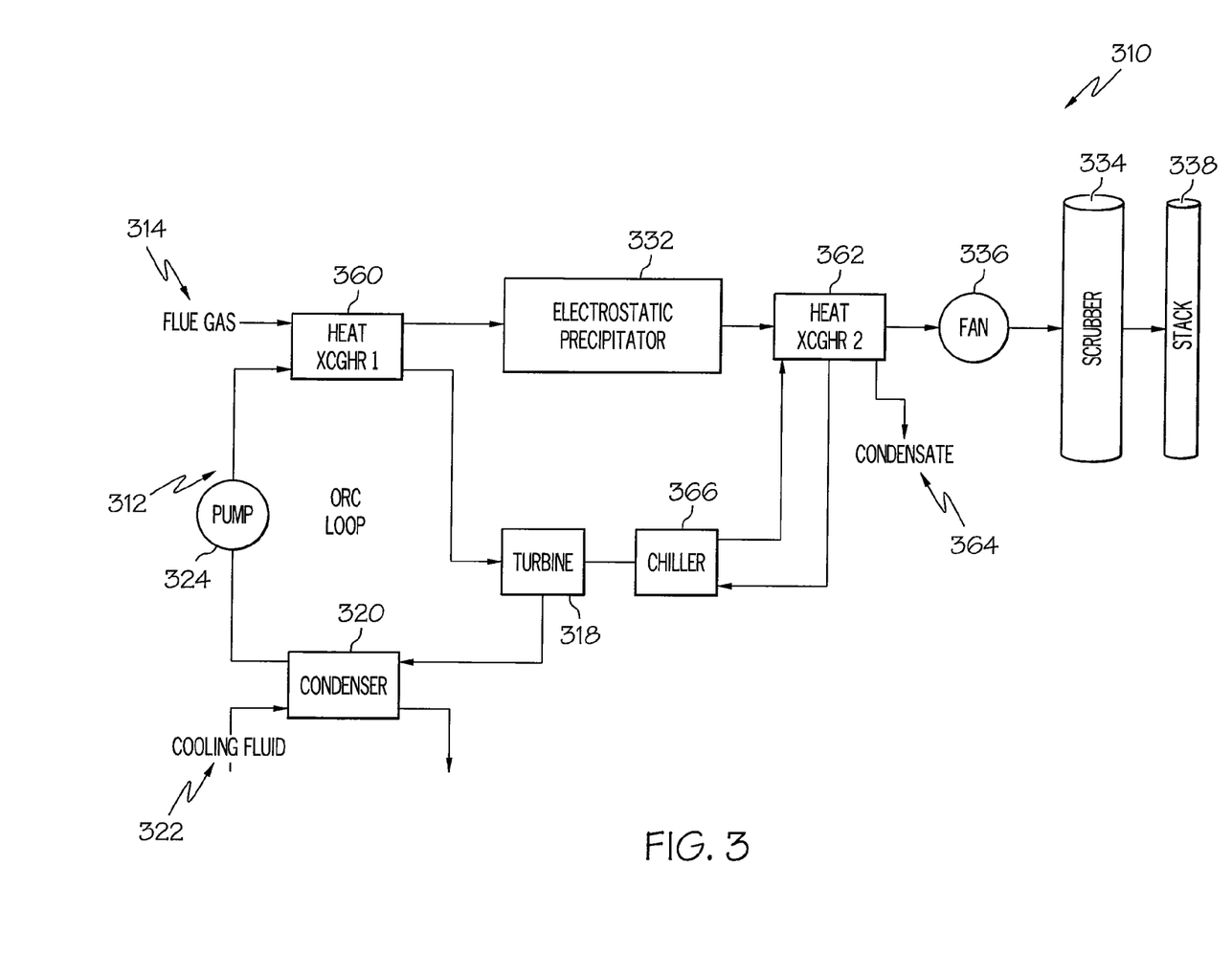
FIG. 3 illustrates another example system for the reduction of pollutants in the flue gas of combustion processes.

Turning now to the example of FIG. 3, another example system 310 for the reduction of pollutants in the flue gas of combustion processes is illustrated. It is to be appreciated that, for brevity, similar or identical elements are referenced by use of a like number in a 300-series designation (i.e., 312, 314, etc.), and that the example system can include more or less elements than those previously described herein. Different or new elements are referenced by a new number. Similarly, for brevity, further discussion of similar or identical elements may be limited, but such previous discussion of similar or identical elements is hereby incorporated by reference.

As before, the ORC apparatus 312 is integrated into the scrubbing process to provide cooling of the flue gas 314 stream ahead of one or more downstream filtration systems, such as electrostatic precipitators 332 and/or scrubbers 334. Also as before, the ORC apparatus 312 operates on the principles of the Rankine system, including a heat exchanger (as will be further discussed), turbine 318, condenser 320, and pump 324.

Scrubbers utilize significant quantities of fresh water to cool flue gas down to saturation or near saturation temperatures. Providing a heat exchanger 362 directly upstream of the scrubber 334 that utilizes chilled circulating fluid to cool the gas can reduce make up water requirements for the scrubber 334.

The instant ORC apparatus 312 utilizes two heat exchangers 360, 362. The first heat exchanger 360 can cool the flue gas to temperatures above the acid dew point upstream of the electrostatic precipitator 332. Maintaining temperature above the acid dew point can avoid potential problems associated with excessive corrosion of the electrostatic precipitator 332, while improving collection efficiency through flue gas 314 volume reduction and improved dust resistivity.

The first heat exchanger 360, which can be referred to as a high temperature heat exchanger, can cool the flue to temperatures above the acid dew point and can be fabricated from conventional materials. The heat energy extracted by the first heat exchanger 360 can be utilized, via expansion of the working fluid in the turbine 318, to generate useful electrical or mechanical work. Similarly, if present, condensed water vapor (not shown) can be recovered during this process that, when treated, can be utilized to fulfill other plant needs.

Downstream of the electrostatic precipitator 332 and upstream of the scrubber 334, the flue gas temperature can be further cooled to temperatures below the acid dew point. Condensation of the acids can reduce, such as eliminate, the acid plume associated with most wet scrubbers burning sulfur-bearing coal. Similarly, plume buoyancy can be better controlled, as a dry plume is generally less subject to ambient conditions. The flue gas 314 volume can be reduced through the cooling process and the water used to maintain acceptable scrubber 334 operating temperature is reduced, such as eliminated. For example, with proper treatment, the water condensate 364 provided from the pre-scrubbing second heat exchanger 362 could be recycled for use in the plant.

The second heat exchanger 362 disposed downstream from the first heat exchanger 360 can be utilized to further reduce the temperature of the flue gas 314 to below the acid dew point. As such, the second heat exchanger 362 can be manufactured of corrosive resistant materials because the reduced flue gas 314 temperature would be reduced to a level that causes acids to condense thereon.

The second heat exchanger 362 could utilize a second low temperature loop in the ORC apparatus 312 (or even a separate ORC), or could utilize cool liquid generated in a chiller 366 powered by the primary ORC cycle. For example, as shown, the turbine 318 can generate useful electrical or mechanical work to drive the chiller 366 to chill a desired liquid. This chilled liquid would cause the flue gas 314 stream passing through the second heat exchanger 362 to drop below the acid dew point condensation temperature, removing many of the water-soluble pollutants.

In another example, not shown, the second heat exchanger 362 could utilize an absorption chiller in place of the generator or driven chiller. The absorption chiller could utilize ammonia, ammonia-water, or a broad range of other commercial refrigerants. The absorption chiller could either have an evaporator in the gas stream for further chilling, or chill water via an external evaporator that is injected into the gas stream. Where chilling rather than incremental power production is an important goal, such a scenario may be more efficient.

In the case of a filtration system that does not utilize an electrostatic precipitator 332 for particulate matter control, the chilled liquid provided by the chiller 366 can be sprayed directly into the gas entering the reactor tower of the scrubber 334. For example, one or more spray arrays can use chilled water as a chilling and filtration medium in direct contact with the flue gas. The spray arrays can create a continuous chilled water spray curtain or the like. Cooling and the associated condensation of acids would occur in the scrubber 334 vessel that is designed to accommodate corrosion.

Figure 4:
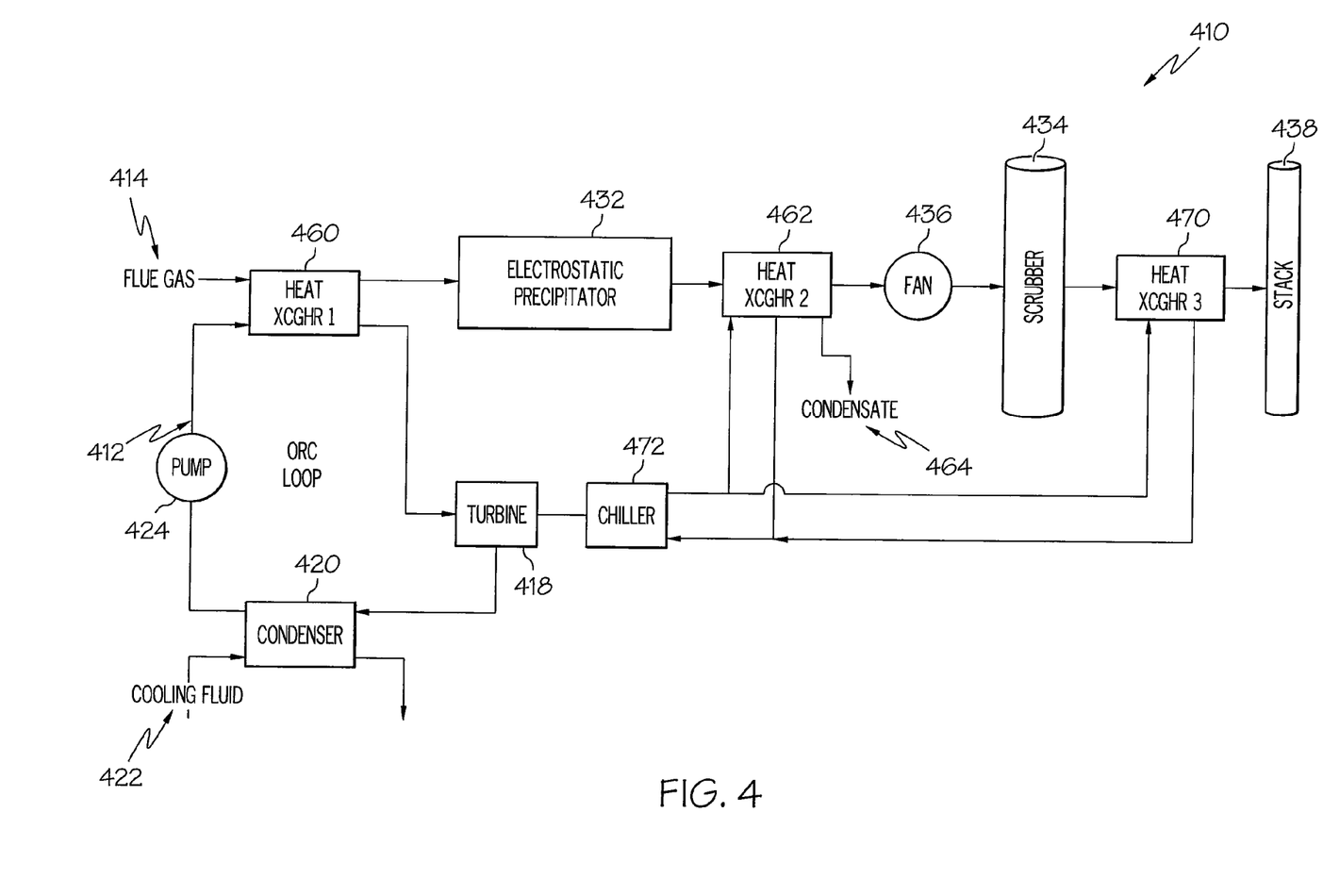
FIG. 4 illustrates yet another example system for the reduction of pollutants in the flue gas of combustion processes.

Turning now to the example of FIG. 4, yet another example system 410 for the reduction of pollutants in the flue gas of combustion processes is illustrated. It is to be appreciated that, for brevity, similar or identical elements are referenced by use of a like number in a 400-series designation (i.e., 412, 414, etc.), and that the example system 410 can include more or less elements than those previously described herein. Different or new elements are referenced by a new number. Similarly, for brevity, further discussion of similar or identical elements may be limited, but such previous discussion of similar or identical elements is hereby incorporated by reference.

In general, the instant system 410 is similar to the previously described system 310. As before, a similar ORC apparatus 412 is integrated into the scrubbing process to provide cooling of the flue gas 414 stream ahead of one or more downstream filtration systems, such as electrostatic precipitators 432 and/or scrubbers 434.

The instant ORC apparatus 412 utilizes three heat exchangers 460, 462, 470. The first heat exchanger 460 can cool the flue gas to temperatures above the acid dew point upstream of the electrostatic precipitator 432, and can be fabricated from conventional materials. The heat energy extracted by the first heat exchanger 460 can be utilized, via expansion of the working fluid in the turbine 418, to generate useful electrical or mechanical work. The second heat exchanger 462 disposed downstream from the first heat exchanger 460 can be utilized to further reduce the temperature of the flue gas 414 to below the acid dew point. As such, the second heat exchanger 462 can be manufactured of corrosive resistant materials because the reduced flue gas 414 temperature would be reduced to a level that causes acids to condense thereon. Condensed water vapor 464 can be recovered from either or both of the heat exchangers 460, 462 that, when treated, can be utilized to fulfill other plant needs.

The second heat exchanger 462 could utilize a second low temperature loop in the ORC apparatus 412 (or even a separate ORC), or could utilize cool liquid generated in a chiller 472 powered by the primary ORC cycle. For example, as shown, the turbine 418 can generate useful electrical or mechanical work to drive the chiller 472 to chill a desired liquid. This chilled liquid would cause the flue gas 414 stream passing through the second heat exchanger 462 to drop below the acid dew point condensation temperature, removing many of the water-soluble pollutants.

The third heat exchanger 470 can be disposed downstream of the scrubber 434 and upstream of the exhaust stack 438. The third heat exchanger 470 can be utilized to de-mist and chill the filtered flue gas 414 exiting the scrubber 434, such as to a temperature below the saturation temperature. In this manner the visible plume could be eliminated from the scrubber effluent. The power generated from waste heat of the first heat exchanger 460 can be used to power the chiller 472, via the turbine 418, to provide cooled liquid for de-misting and chilling the flue gas 414 exiting the scrubber. The same chiller 472 can provide chilled liquid to each of the second and third heat exchangers 462, 470, or separate chillers (not shown) can be provided for each heat exchanger. In other examples, water condensate 464 provided by the preceding heat exchangers 460, 462 can be utilized to the cooled liquid for the third heat exchanger 470. More efficient de-misting can also remove fine droplets created in the scrubber 434 that may be counted as precursors to fine particulate against various governmental regulations, such as PM2.5 regulations.

In addition or alternatively, either or both of the second and third heat exchangers 462, 470 could utilize an absorption chiller as described previously herein. In addition or alternatively, the third heat exchanger 470 could be configured to heat the stream of flue gas 14 after the scrubber 434 to reduce, such as eliminate, the steam plume that is emitted from most scrubbers. Heating the flue gas 14 can inhibit the flue gas 14 from progressing through the condensation phase after exiting the stack 438. For example, the third head exchanger 470 could be operated "backwards" from the previous description to heat the stream of flue gas 14 (i.e., instead of cooling it), and may even act as an additional source of cooling for the chiller 472.

The instant application further describes methods for the reduction of pollutants in the flue gas of combustion processes utilizing any of the various systems 10, 210, 310, 410 discussed herein. In one example, the method can include the steps of providing an organic Rankine cycle apparatus utilizing a working fluid and including at least one heat exchanger is arranged in thermal communication with the flue gas, and reducing the temperature of the flue gas to a second temperature less than the first temperature by vaporizing the working fluid within the heat exchanger utilizing thermal energy derived from the flue gas. The method can further include the step of filtering the flue gas through at least one filter disposed downstream of the heat exchanger to remove pollutants from the flue gas. In another example, the method can include the steps of providing a second heat exchanger arranged in thermal communication with the flue gas and disposed downstream of the at least one heat exchanger of the organic Rankine cycle apparatus and upstream of the electrostatic precipitator. The method can further include the step of reducing the temperature of the flue gas to a third temperature less than the second temperature by the thermal communication of the flue gas with the second heat exchanger. In yet another example, the method can include the steps of providing a third heat exchanger arranged in thermal communication with the flue gas, wherein the third heat exchanger is disposed downstream of the scrubber and reduces the temperature of the flue gas to a fourth temperature less than the third temperature by the thermal communication of the flue gas with the third heat exchanger. In another example, the method can include the step of collecting condensate from condensation of the flue gas caused by at least one of the heat exchangers, and treating the condensate to remove pollutants from the condensate. It is to be understood that the foregoing steps are merely intended as example steps, and that the method can include any additional or different steps related to any of the structure or methodology discussed herein.

In addition or alternatively, any or all of the heat exchangers discussed herein can utilize direct water contact spray systems for cooling the flue gas. For example, one or more spray arrays can use chilled water as a chilling and filtration medium in direct contact with the flue gas. The spray arrays can create a continuous chilled water spray curtain or the like.

The various systems 10, 210, 310, 410 discussed herein can provide benefits at the inlet of the scrubber, which in many power plants follows the electrostatic precipitator. The flue gas stream entering the scrubber can be cooled to saturation, reducing, such as eliminating, the water necessary to quench the flue gas stream. Acids that are not effectively removed in most wet scrubbers could be eliminated from the flue gas stream.

In addition or alternatively, the potential exists for the addition chemicals ahead of the ORC heat exchanger 16, 250, 360, 460 to reduce, such as minimize, corrosion or enhance removal of pollutants. Sorbents and/or solutions that reduce, such as neutralize, acids such as lime or magnesium oxide may be introduced into the flue gas 14, 214, 314, 414 for the purpose of corrosion control. Other compounds that may increase oxidation of mercury, such as chloride, may also be added at the first ORC heat exchanger 16, 250, 360, 460. The location at which the sorbent is injected and the type of sorbent injected can be a function of the goal. Multiple goals, such as acid neutralization and mercury oxidation, could be accomplished with two or more sorbents injected at one or more locations. For example, various dry or wetted sorbents can be injected into a venturi section contained in the reactor tower. The heat exchangers would be located in the duct section ahead of the reactor tower. Minimal additional water would be required during the scrubbing process due to high levels of recirculated sorbent and fly ash. Process temperature could be controlled through addition of atomized water in the reactor tower.

By combining air filtration and chilling, the system of the instant application may reduce overall direct material and labor costs. Likewise, the ongoing maintenance of the system as a whole as compared to known devices should be reduced. As a result, the system of the instant application may provide reliable power output and an efficiency increase regardless of ambient conditions.

Utilizing an integrated ORC system is a unique approach to reducing pollutants contained in power plant combustion products. Operating costs can be lower than comparable methods based on recovery of significant water during the cooling process. Power requirements can be reduced through use of waste heat in the ORC. Waste products from the reactor tower can be dry relative to conventional wet scrubber by-products, and the process addresses various condensable pollutants that wet scrubbing is not capable of, or not efficient at, removing, such as SO2, SO3, mercury, etc.

The invention has been described with reference to the example embodiments described above. Modifications and alterations will occur to others upon a reading and understanding of this specification. Examples embodiments incorporating one or more aspects of the invention are intended to include all such modifications and alterations insofar as they come within the scope of the appended claims.

What is claimed is:

1. A method of reducing the concentration of pollutants in a combustion flue gas having a first temperature, including the steps of:
   providing an organic Rankine cycle apparatus utilizing a working fluid and including at least one heat exchanger is arranged in thermal communication with the flue gas;
   reducing the temperature of the flue gas to a second temperature less than the first temperature by vaporizing the working fluid within the heat exchanger utilizing thermal energy derived from the flue gas;
   filtering the flue gas through at least one filter disposed downstream of the heat exchanger to remove pollutants from the flue gas; and
   at least partially condensing an acidic component in the flue gas before said filtering.

2. The method of claim 1, wherein the second temperature is equal to or less than an acid dew point of the flue gas, and said at least partially condensing the acidic component is performed by the at least one heat exchanger included in the Rankine cycle apparatus.

3. The method of claim 1, wherein the working fluid includes an organic fluid capable of being vaporized at the first temperature.

4. The method of claim 1, wherein the step of filtering the flue gas through at least one filter includes filtering the flue gas through at least one of an electrostatic precipitator and a scrubber.

5. The method of claim 4, further including the steps of:
   providing a second heat exchanger arranged in thermal communication with the flue gas, the second heat exchanger being disposed downstream of the at least one heat exchanger of the organic Rankine cycle apparatus and upstream of the electrostatic precipitator; and
   reducing the temperature of the flue gas to a third temperature less than the second temperature by the thermal communication of the flue gas with the second heat exchanger,
   wherein the second temperature is equal to or greater than an acid dew point of the flue gas, and the third temperature is equal to or less than an acid dew point of the flue gas, and said at least partially condensing the acidic component is performed using the second heat exchanger.

6. The method of claim 5, further including the step of providing a chiller for cooling a liquid utilized by the second heat exchanger for reducing the temperature of the flue gas.

7. The method of claim 4, further including the steps of:
   providing a second heat exchanger arranged in thermal communication with the flue gas, the second heat exchanger being disposed downstream of the electrostatic precipitator; and
   reducing the temperature of the flue gas to a third temperature less than the second temperature by the thermal communication of the flue gas with the second heat exchanger,
   wherein the second temperature is equal to or greater than an acid dew point of the flue gas, and the third temperature is equal to or less than an acid dew point of the flue gas, and said at least partially condensing the acidic component is performed using the second heat exchanger.

8. The method of claim 7, further including the steps of:
   collecting condensate from condensation of the flue gas caused by at least one of the first and second heat exchangers; and treating the condensate to remove pollutants from the condensate.

9. The method of claim 7, further including the steps of:
filtering the flue gas through the scrubber arranged downstream from the electrostatic precipitator;
providing a third heat exchanger arranged in thermal communication with the flue gas, the third heat exchanger being disposed downstream of the scrubber; and
reducing the temperature of the flue gas to a fourth temperature less than the third temperature by the thermal communication of the flue gas with the third heat exchanger,
wherein the fourth temperature is equal to or less than a saturation temperature of the flue gas.

10. The method of claim 1, further including the step of providing the organic Rankine cycle apparatus with a turbine, a condenser, and a pump arranged in closed-loop fluid communication with the heat exchanger.

11. The method of claim 10, further including at least one driven device operatively coupled to the turbine that is powered by operation of the turbine, wherein the driven device includes at least one of a generator for generating electrical energy and a chiller for cooling a liquid.

12. The method of claim 1, further including the step of injecting at least one sorbent into the flue gas to enhance removal of pollutants from the flue gas.

13. A method of reducing the concentration of pollutants in a combustion flue gas having a first temperature, including the steps of:
providing an organic Rankine cycle apparatus utilizing a working fluid and including at least one heat exchanger, turbine, condenser, and pump arranged in closed-loop fluid communication, wherein the at least one heat exchanger is arranged in thermal communication with the flue gas;
reducing the temperature of the flue gas to a second temperature less than the first temperature by vaporizing the working fluid within the heat exchanger utilizing thermal energy derived from the flue gas;
filtering the flue gas through at least one filter disposed downstream of the heat exchanger to remove pollutants from the flue gas; and
at least partially condensing an acidic component in the flue gas before said filtering.

14. The method of claim 13, further including the steps of:
providing a second heat exchanger arranged in thermal communication with the flue gas, the second heat exchanger being disposed downstream of the at least one heat exchanger of the organic Rankine cycle apparatus;
reducing the temperature of the flue gas to a third temperature less than the second temperature by the thermal communication of the flue gas with the second heat exchanger,
wherein the second temperature is equal to or greater than an acid dew point of the flue gas, and the third temperature is equal to or less than an acid dew point of the flue gas, and said at least partially condensing the acidic component is performed using the second heat exchanger;
collecting condensate from condensation of the flue gas caused by the second heat exchanger; and
treating the condensate to remove pollutants from the condensate.

15. The method of claim 13, wherein the step of filtering the flue gas through at least one filter includes filtering the flue gas through an electrostatic precipitator, and wherein the second heat exchanger is located downstream of the electrostatic precipitator.

16. The method of claim 13, further including at least one driven device operatively coupled to the turbine that is powered by operation of the turbine, wherein the driven device includes at least one of a generator for generating electrical energy and a chiller for cooling a liquid.

17. A system configured to reduce the concentration of pollutants in a combustion flue gas having a first temperature, including:
an organic Rankine cycle apparatus utilizing a working fluid and including at least one heat exchanger, turbine, condenser, and pump arranged in closed-loop fluid communication, wherein the at least one heat exchanger is arranged in thermal communication with the flue gas,
wherein the temperature of the flue gas is reduced, via the at least one heat exchanger, to a second temperature less than the first temperature by vaporizing the working fluid within the heat exchanger utilizing thermal energy derived from the flue gas;
a second heat exchanger arranged in thermal communication with the flue gas, the second heat exchanger being disposed downstream of the at least one heat exchanger of the organic Rankine cycle apparatus,
wherein the temperature of the flue gas is reduced, via the second heat exchanger, to a third temperature less than the second temperature by the thermal communication of the flue gas with the second heat exchanger; and
at least one scrubber disposed downstream of at least one of the heat exchangers and configured to remove pollutants from the flue gas by filtering the flue gas therethrough, wherein at least one of the first temperature and the second temperature is equal to or less than an acid dew point of the flue gas to at least partially condense an acidic component in the flue gas before said filtering.

18. The system of claim 17, further including:
a third heat exchanger arranged in thermal communication with the flue gas, the third heat exchanger being disposed downstream of the scrubber,
wherein the temperature of the flue gas is reduced, via the third heat exchanger, to a fourth temperature that is equal to or less than a saturation temperature of the flue gas.

19. The system of claim 18, further including at least one chiller operatively coupled to the turbine that is powered by operation of the turbine, wherein the chiller cools a liquid utilized by at least one of the second and third heat exchangers for reducing the temperature of the flue gas.

20. The system of claim 17, further including collecting structure configured to collect condensate from condensation of the flue gas caused by at least one of the heat exchangers such that the condensate can be treated to remove pollutants therefrom.

* * * * *